(12) United States Patent
Nukui et al.

(10) Patent No.: US 8,733,537 B2
(45) Date of Patent: May 27, 2014

(54) GUIDING APPARATUS THAT MAINTAINS ATTITUDE OF SUSPENDED OBJECT DURING CONVEYANCE

(71) Applicant: NHK Spring Co., Ltd., Yokohama (JP)

(72) Inventors: Kotaro Nukui, Yokohama (JP); Satoshi Akiyama, Yokohama (JP); Tsutomu Fukunaga, Koka (JP); Masahiro Chigasaki, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/788,772

(22) Filed: Mar. 7, 2013

(65) Prior Publication Data

US 2013/0240328 A1    Sep. 19, 2013

(30) Foreign Application Priority Data

Mar. 16, 2012    (JP) ................................. 2012-059752

(51) Int. Cl.
*B65G 43/08*    (2006.01)
(52) U.S. Cl.
USPC .......................................... 198/683; 198/685
(58) Field of Classification Search
USPC .......................... 198/620, 680, 681, 683, 685
See application file for complete search history.

(56) References Cited

U.S. PATENT DOCUMENTS

| | | | | |
|---|---|---|---|---|
| 1,717,970 A * | 6/1929 | Gould | ............................. | 49/234 |
| 3,190,236 A * | 6/1965 | Leach | ............................ | 198/683 |
| 4,029,199 A * | 6/1977 | Reens | ............................ | 198/683 |
| 4,222,481 A * | 9/1980 | Dehne et al. | .................... | 198/684 |
| 4,433,627 A * | 2/1984 | Forshee | .......................... | 104/95 |
| 4,942,956 A * | 7/1990 | Acker et al. | ................. | 198/465.3 |
| 5,857,556 A * | 1/1999 | Bonacorsi | ....................... | 198/683 |
| 6,196,376 B1 * | 3/2001 | Grabmann et al. | ............ | 198/837 |
| 6,431,347 B1 * | 8/2002 | Gossner | ....................... | 198/687.1 |
| 6,460,685 B1 * | 10/2002 | Johansson et al. | .......... | 198/465.4 |
| 6,957,940 B2 * | 10/2005 | Blanc | ........................ | 414/222.01 |
| 7,171,906 B2 * | 2/2007 | Tada et al. | ....................... | 104/165 |
| 7,798,309 B2 * | 9/2010 | Rice et al. | ................... | 198/465.4 |

FOREIGN PATENT DOCUMENTS

JP    2011-161616    8/2011

* cited by examiner

*Primary Examiner* — Douglas Hess
(74) *Attorney, Agent, or Firm* — Jordan and Hamburg LLP

(57) ABSTRACT

A guiding apparatus includes a hanger line that continuously conveys hangers that are suspended from the hanger line at predetermined intervals and a guide unit installed in the line and driven in synchronization with the line while holding at least one of the objects, thereby maintaining the attitude of the object and guiding the attitude maintained object along the line.

4 Claims, 9 Drawing Sheets

LEFT DEVIATION    NORMAL    RIGHT DEVIATION

GUIDING APPARATUS THAT MAINTAINS ATTITUDE OF SUSPENDED OBJECT DURING CONVEYANCE

BACKGROUND OF THE INVENTION

1. Field of the Invention

The present invention relates to a guiding apparatus that maintains the attitude of suspended objects such as hangers conveyed by a hanger line to hang and convey, for example, car stabilizers.

2. Description of Related Art

Japanese Unexamined Patent Application Publication No. 2011-161616 discloses a work feeding apparatus and a work feeding method that feed works to a hanger line. This related art employs a robot having a hand for holding and three-dimensionally moving a work, a robot controller for controlling the robot, an image taking unit for photographing an image of a hanger conveyed through the hanger line, and a real-time computer for providing the robot controller with a track of the robot's hand.

According to the image of the hanger, the robot controller detects the position and attitude of a hook of the hanger, and according to the detection, feedback-controls the robot so that the robot's hand holding the work may follow the hook of the hanger and hang the work on the hook of the hanger.

The related art conveys a plurality of hangers through the hanger line and safely and surely hangs works on the hooks of the hangers without stopping the hanger line, without regard to the orientation of each hook, and without employing other special facilities. In feeding works to the hanger line, the related art is able to feed works to the hangers independent of manpower and improve the operating speed of the hanger line.

The related art, however, has a problem in steadying the attitude of a hanger suspended from the hanger line when the hanger receives a work on the hook thereof, and therefore, has a limit on correctly hanging a work on a hook of a hanger conveyed through a hanger line.

This problem widely exists in convey lines that convey suspended objects similar to the hangers and subject the objects to some operation that requires the attitude of each object to be stable.

SUMMARY OF THE INVENTION

An object of the present invention is to provide a guiding apparatus capable of steadying the attitude of a suspended object when necessary during the conveyance of the suspended object.

In order to accomplish the object, an aspect of the present invention provides a guiding apparatus including a line continuously conveying objects that are suspended from the line at predetermined intervals, and a guide unit installed in the line and driven in synchronization with the line while holding at least one of the objects, thereby maintaining the attitude of the object and guiding the attitude maintained object along the line.

According to this aspect of the present invention, the guiding apparatus is capable of maintaining the attitude of at least one of the objects suspended from the line and guiding the conveyance of the attitude maintained object along the line by the guide unit.

DETAILED DESCRIPTION OF EMBODIMENTS

A guiding apparatus according to an embodiment of the present invention will be explained. The guiding apparatus is capable of maintaining the attitude of a suspended object such as a hanger when necessary during the conveyance of the suspended object.

For this, the guiding apparatus according to the embodiment includes a hanger line that is a line continuously conveying hangers as objects that are suspended from the hanger line at predetermined intervals, and a guide unit installed in the hanger line and driven in synchronization with the hanger line while holding at least one of the hangers, thereby maintaining the attitude of the target hanger and guiding the attitude maintained target hanger along the hanger line.

It is preferable for the guiding apparatus that the guide unit has a guide plate and a guide belt that is moved along the guide plate in synchronization with the hanger line. The guide belt holds the at least one of the hangers with respect to the guide plate.

The embodiment will be explained in detail with reference to the drawings.

Figure 1:
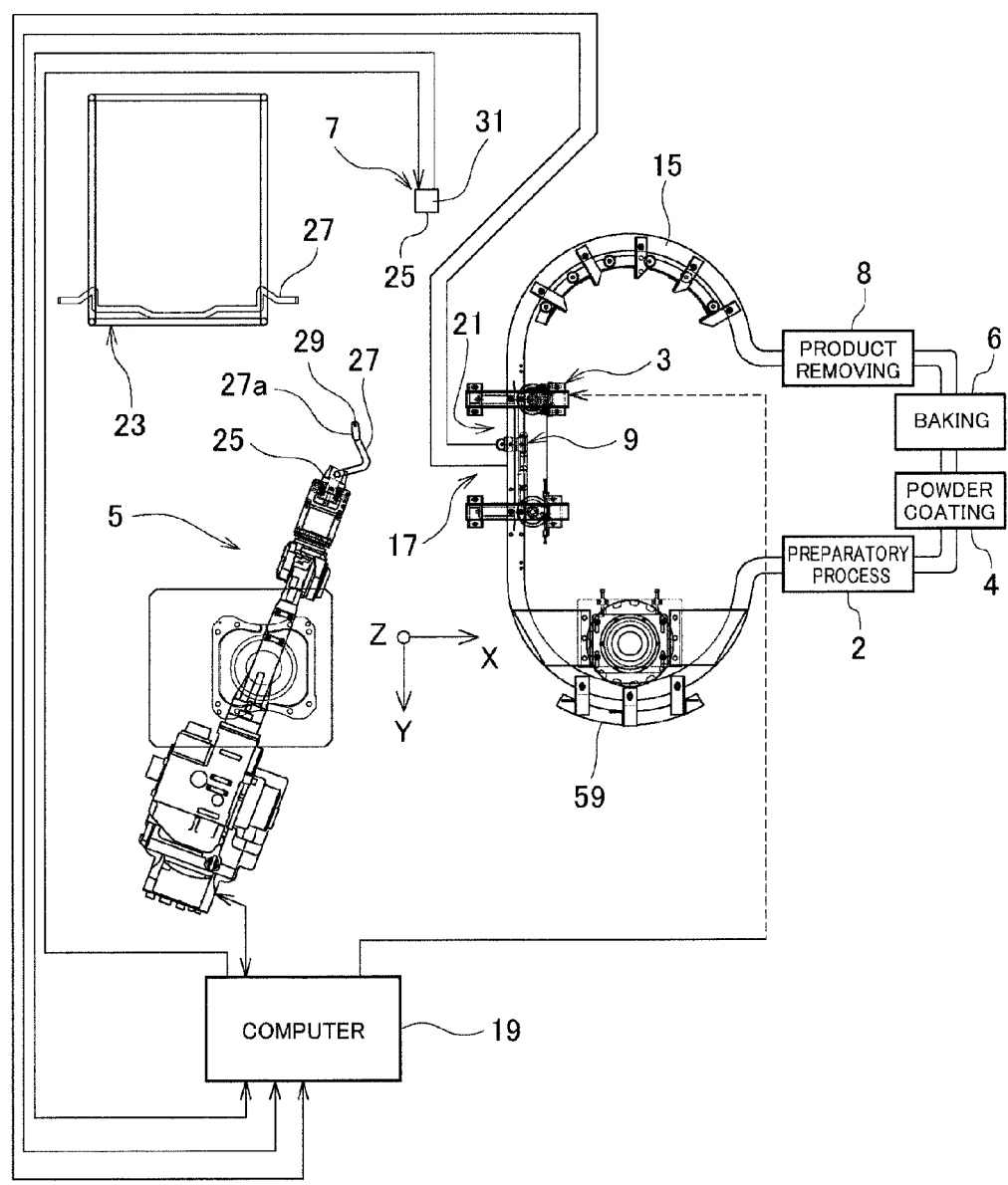
FIG. 1 is a plan view illustrating a hanger line including a guide unit according to an embodiment of the present invention.
Figure 2:
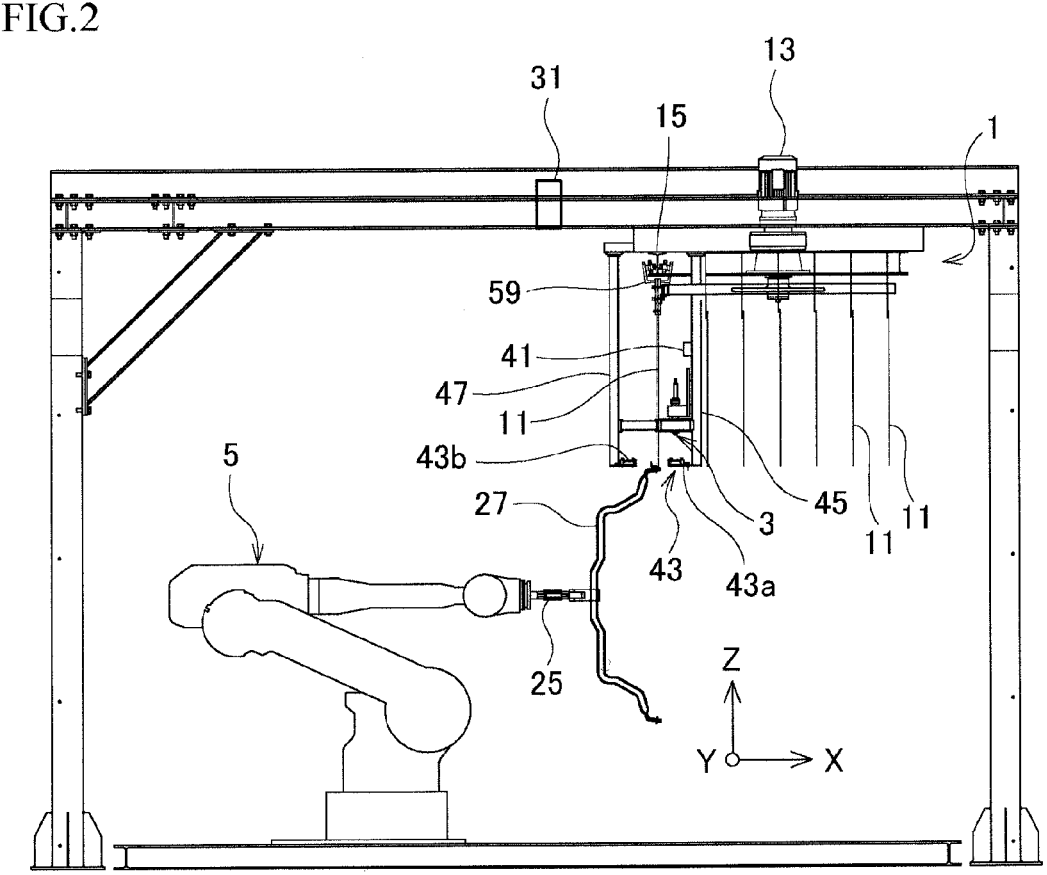
FIG. 2 is a side view illustrating the hanger line and guide unit.

FIG. 1 is a plan view illustrating the hanger line 1 including the guide unit 3 and FIG. 2 is a side view illustrating the same. The guiding apparatus according to the embodiment of the present invention is applied to the hanger line 1 and includes the guide unit 3.

The hanger line 1 includes a robot 5, a hole deviation detector 7, and an attitude deviation detector 9.

The hanger line 1 conveys car stabilizers 27 to a painting process or the like. For the painting process, the hanger line 1 subjects the stabilizers 27 to, for example, a preparatory process 2, a powder coating process 4, a baking process 6, and a product removing process 8. In order to convey the stabilizers 27, the hanger line 1 suspends a plurality of hangers 11 therefrom at predetermined intervals and continuously conveys the hangers 11 along a rail 15 with a driving motor 13. The hangers 11 each have a hook 39 on which a stabilizer 27 is hung to be conveyed for the painting process.

The stabilizers 27 hung on the hangers 11 are cleaned by the preparatory process 2. The cleaned stabilizers 27 are coated with powder by the powder coating process 4. The coated stabilizers 27 are baked by the baking process 6 to cure the powder coatings thereon. The finished stabilizers 27 with the cured powder coatings are taken out of the hanger line 1 by the product removing process 8.

The attitude deviation detector 9 detects an attitudinal deviation of a given hanger 11 (target hanger 11) with respect to a reference hanger attitude. The reference hanger attitude defines a reference hanger to be allowed to hang a reference stabilizer having a hole in a reference hole position at the hanging location 17 in the hanger line 1. The attitudinal deviation of the target hanger includes a deviation due to a shape of the hanger 11 and/or a deviation due to a displacement or swinging of the hanger 11 itself. The attitude deviation detector 9 outputs a detection result to a computer 19 as the operation unit. According to the embodiment, the attitude deviation detector 9 detects the attitude of the target hanger 11 at an attitude detecting location 21 set in the hanger line 1 in front of the hanging location 17.

The guide unit 3 maintains the attitude of the target hanger 11 from the attitude detecting location 21 up to the hanging location 17 without change and guides the attitude maintained target hanger 11 between them. Details of the guide unit 3 will be explained later.

The robot 5 controls a movement of a hand 25 for controlling a movement of a stabilizer 27 picked up from a carrier 23 and held by the hand 25 to transfer the stabilizer 27 to the hanging location 17, and at the hanging location 17, catch a hook 39 of a target hanger 11 with the hole 29 of the stabilizer 27 for hanging the stabilizer 27 on the target hanger 11.

The robot 5 corrects the control of the movement of the hand 25 according to a positional deviation of the hole 29 of the stabilizer 27 and an attitudinal deviation of the target hanger 11. According to the embodiment, the hand 25 transfers the stabilizer 27 to an intermediate location that is set in front of the hanging location 17 while the movement of the hand 25 is corrected according to the positional deviation of the hole 29 of the stabilizer 27. Thereafter, the hand 25 transfers the stabilizer 27 from the intermediate location to the hanging location 17 while the movement of the hand 25 is corrected according to the attitudinal deviation of the target hanger 11.

The hole deviation detector 7 detects the positional deviation of the hole 29 of the stabilizer 27 with respect to a reference hole position. The reference hole position defines a hole of a reference stabilizer to be allowed to catch a hook of a reference hanger in the reference hanger attitude at the hanging location 17. The hole deviation detector 7 according to the embodiment outputs a detected result as coordinate values on a robot coordinate system. The hole deviation detector 7 includes a camera 31 as the image taking unit and the computer 19 as the operation unit connected to the camera 31 through a power line.

The camera 31 photographs the hole 29 of the stabilizer 27 at a hole measuring location 35 that is set in a path along which the stabilizer 27 is transferred with the hand 25 of the robot 5. The camera 31 outputs image data corresponding to the photographed image of the hole 29 to the computer 19. According to the image data, the computer 19 computes a positional deviation of the hole 29 as coordinate values (X, Y) on the robot coordinate system to output the computed positional deviation as the measurement result.

The coordinate values (X, Y) represent the positional deviation of the photographed hole 29 with respect to a master hole position Mh. The master hole position Mh is a reference hole position at the hole measuring location 35 and corresponds to the reference hole position defining a hole of a reference stabilizer to be allowed to catch a hook of a reference hanger in the reference hanger attitude at the hanging location 17.

Figure 3:
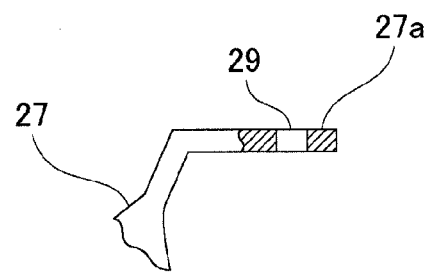
FIG. 3 is a partial sectional view illustrating a hole of a stabilizer that is fed to the hanger line.
Figure 4:
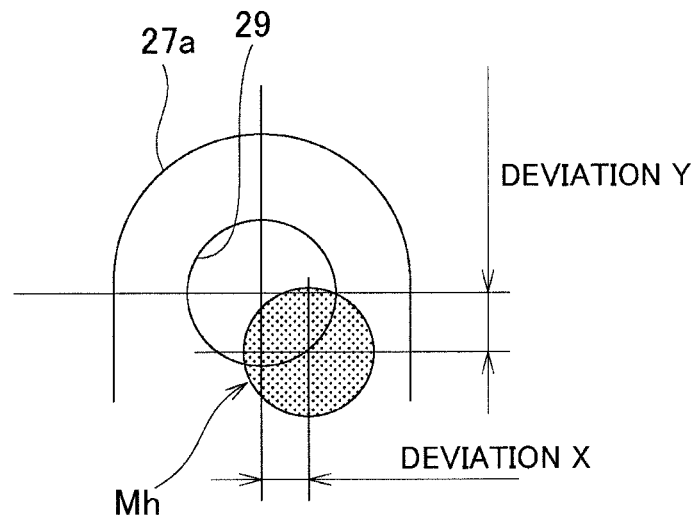
FIG. 4 is a plan view illustrating a positional deviation of a hole of a stabilizer.

FIG. 3 is a partial sectional view illustrating the hole 29 of the stabilizer 27 and FIG. 4 is a plan view illustrating a positional deviation of the hole 29.

As illustrated in FIG. 3, the hole 29 of each stabilizer 27 is formed at each end 27*a* of the stabilizer 27 and the end 27*a* is oriented in the Y-axis direction of the robot coordinate system when the stabilizer 27 is hooked or hung on the hanger 11 at the hanging location 17. The stabilizer 27 is to be installed in a car through the holes 29 that are fastened with respective male threads of left and right suspension members.

In FIG. 4, the positional deviation of the hole 29 of the stabilizer 27 is detected by computing coordinate values (X, Y) of the positional deviation on the robot coordinate system base on the photographed hole 29 with respect to the master hole position Mh. As mentioned above, the master hole position Mh is the reference hole position set at the hole measuring location 27 and corresponds to the reference hole position defining a hole of a reference stabilizer to be allowed to catch a hook of a reference hanger in the reference hanger attitude at the hanging location 17 (FIG. 1). The coordinate value Y is in the conveying direction of the hanger 11 at the hanging location 17 in the hanger line 1.

Figure 5:
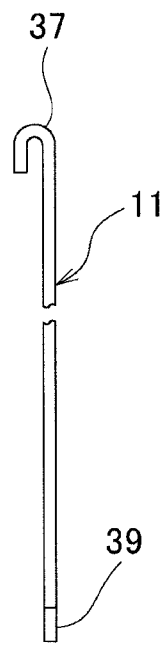
FIG. 5 is a front view illustrating a hanger suspended from the hanger line.
Figure 6:
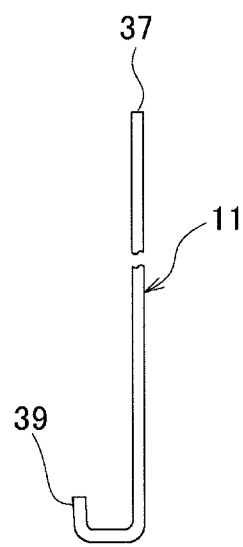
FIG. 6 is a side view illustrating the hanger.

One of the hangers that have the same configuration will be explained in detail. FIG. 5 is a front view illustrating the hanger 11 and FIG. 6 is a side view illustrating the hanger 11.

The hanger 11 has an upper hook (suspension hook) 37 and the lower hook (hanger hook) 39 that has a tip end oriented upward. With the upper hook 37, the hanger 11 is suspended from the hanger line 1. Unless otherwise noted, the "hook" means the "lower hook" as the hanger hook.

Figure 7:
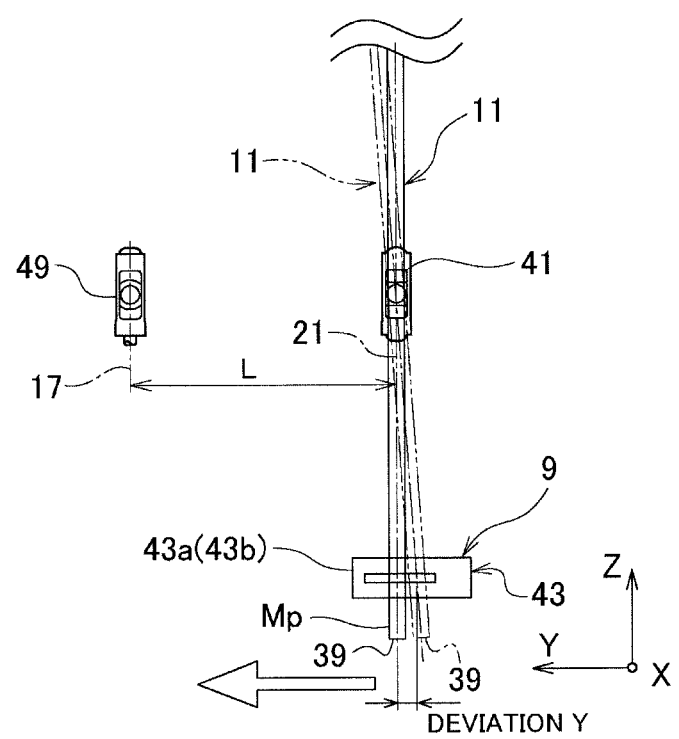
FIG. 7 is a front view illustrating an attitude deviation detector for detecting an attitudinal deviation of the hanger.

FIG. 7 is a front view illustrating the attitude deviation detector 9. The attitude deviation detector 9 detects an attitude of a given hanger 11 (target hanger 11) at the attitude detecting location 21 that is set in front of the hanging location 17. The locations 17 and 21 are separated away from each other by a distance L.

In FIG. 7, the attitude deviation due to a displacement of the hanger 11 itself is exemplarily represented with a dotted line. However, in some cases, the attitude deviation illustrated in FIG. 7 is assumed to be the attitude deviation due to the shape of the hanger 11 for the following explanation.

The attitude deviation detector 9 includes the detecting location sensor 41 and the deviation sensor 43. The detecting location sensor 41 is arranged in an intermediate area corresponding to an intermediate part in a suspending direction of the hanger 11, to sense the intermediate part of the hanger 11. The detecting location sensor 41 is attached to a hanger frame 45. The deviation sensor 43 is arranged in an lower area corresponding to the lower part of the hanger 11 in the suspending direction, to detect the lower part of the hanger 11. The deviation sensor 43 is a transmission laser displacement sensor including an emitter 43*a* and a receiver 43*b* that are attached to the hanger frames 45 and 47, respectively.

When the detecting location sensor 41 detects a target hanger 11, in the case of FIG. 7, the deviation sensor 43 detects a distance between the reference position of a reference hanger (depicted as a continuous line) without deformation or displacement and an actual (deviated) position of the target hanger 11 (depicted as a dotted line). If the target hanger 11 has the attitudinal deviation like FIG. 7, the detecting location sensor 41 outputs the distance as a coordinate value Y on the robot coordinate system.

This coordinate value Y is an attitudinal deviation of the hook 39 of the target hanger with respect to a master hook position Mp defining a hook of a reference hanger that involves no deviation.

At the hanging location 17, a hanging location sensor 49 is arranged on the hanger frame 45.

Control for hooking or hanging a work (the stabilizer 27) on a target hanger 11 will be explained. The motor 13 is driven to convey the hangers 11 through the hanger line 1. At the hanging location 17, the hole 29 of the stabilizer 27 is hooked on the hook 39 of the target hanger 11.

The hole 29 of the stabilizer 27 may have a positional deviation and the target hanger 11 may have an attitudinal deviation due to, for example, deformation. The hole deviation detector 7 detects the positional deviation of the hole 29 as coordinate values (X, Y) and the attitude deviation detector 9 detects the attitudinal deviation of the target hanger 11 as a coordinate value Y, to control the robot 5 and cancel the positional and attitudinal deviations.

The robot 5 holds with the hand 25 the stabilizer 27 having the hole 29 and controls the hand 25 to transfer the stabilizer 27 to the hanging location 17 of the hanger line 1 under the correction of the movement of the hand 25 according to the detected positional and attitudinal deviations. At the hanging location 17, the hand 25 controlled by the robot 5 catches the hook 39 of the target hanger 11 with the hole 29 of the stabilizer 27 for hooking the stabilizer 27 on the hook 39.

Namely, due to the above-mentioned correction of the movement, the hole 29 of the stabilizer 27 correctly catches the hook 39 of the hanger 11 and the stabilizer 27, as a result, the stabilizer 27 is efficiently finished through the preparatory process 2 and the like, to improve productivity.

For the correction of the movement, the camera 31 of the hole deviation detector 7 photographs the hole 29 of the stabilizer 27 at the hole measuring location 35 that is set in the path along which the stabilizer 27 is transferred with the hand 25 of the robot 5. According to the image data from the camera 31, the computer 19 computes coordinate values (X, Y) of the positional deviation to control the robot 5.

The robot 5 carries the stabilizer 27 in advance to the intermediate location in front of the hanging location 17 while the movement of the hand 25 is corrected according to the deviation coordinate values (X, Y).

In the meantime, the attitude deviation detector 9 detects an attitude of the c hanger 11 at the attitude detecting location 21 in front of the hanging location 17.

Namely, the detecting location sensor 41 of the attitude deviation detector 9 detects the target hanger 11 and the deviation sensor 43 detects a deviation Y of the hook 39 of the target hanger 11 with respect to the master position Mp of a hook having no deviation.

The hand 25 of the robot 5 is controlled to transfer the stabilizer 27 from the intermediate location up to the hanging location 17 under the correction of the movement of the hand 25 according to the attitudinal deviation of the target hanger 11.

Figure 8:
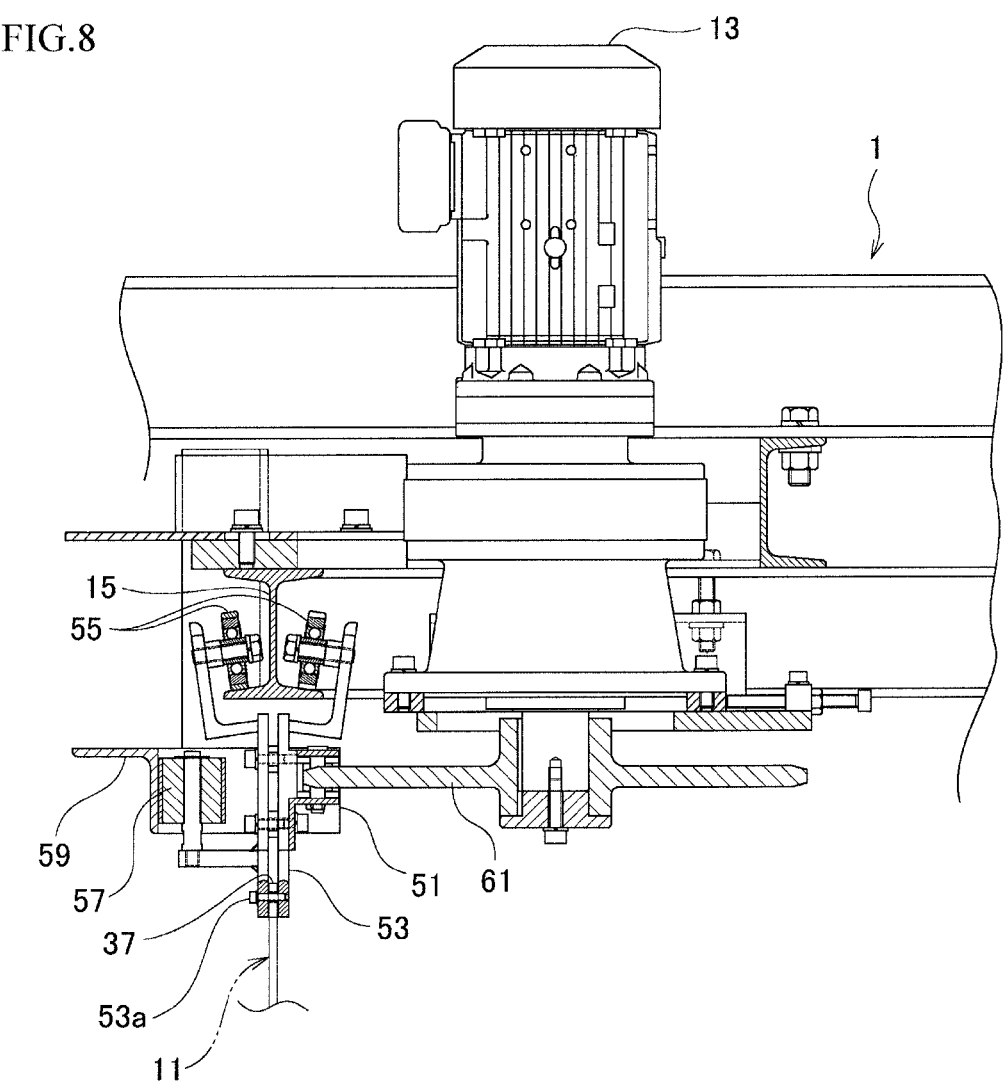
FIG. 8 is an enlarged sectional view illustrating a mechanism for driving hangers in the hanger line.
Figure 9:
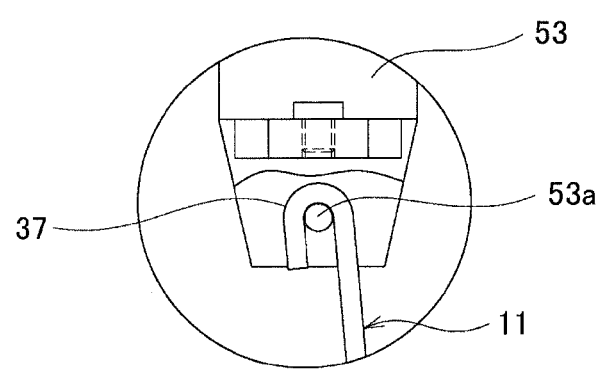
FIG. 9 is an enlarged view illustrating a mechanism for suspending the hunger from the hanger line.

A mechanism for driving the hangers 11 through the hanger line 1 will be explained with reference to FIGS. 8 and 9 in which FIG. 8 is an enlarged sectional view illustrating the mechanism and FIG. 9 is an enlarged view illustrating a mechanism for suspending the hunger 11 from the hanger line 1.

In FIGS. 8 and 9, each hanger 11 is suspended from a suspender 53 connected to a chain 51 that runs along the hanger line 1. The suspender 53 has a pin 53a with which the upper hook (suspension hook) 37 of the hanger 11 engages for suspending the hanger 11 from the suspender 53.

The suspender 53 travels with a roller 55 along the rail 15. The suspender 53 is provided with a guide roller 57 that rolls along a guide rail 59 to guide the suspender 53 along the guide rail 59.

The chain 51 is wrapped around a sprocket 61 that is driven by the motor 13. The motor 13 drives the sprocket 61 to move the chain 51 along the rail 9.

With the chain 51, the hangers 11 are continuously conveyed through the hanger line 1, and at the hanging location 17, the stabilizer 27 is hung on a given one of the hangers 11 and is successively conveyed through the preparatory process 2, powder coating process 4, baking process 6, and product removing process 8.

The guide unit according to the embodiment of the present invention will be explained in detail.

Figure 10:
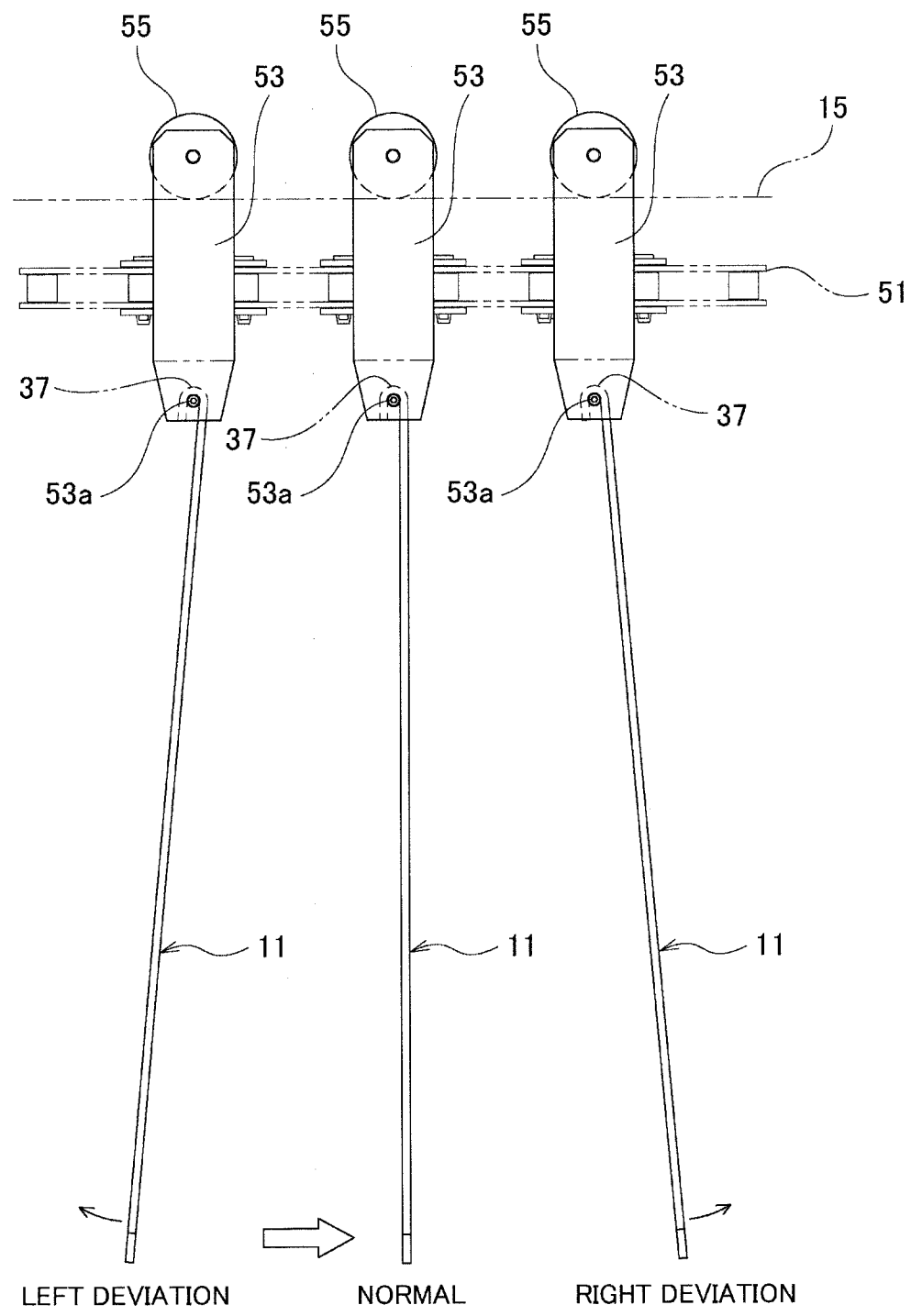
FIG. 10 is a front view illustrating examples of attitudinal deviations of hangers in the hanger line.

FIG. 10 is a front view illustrating examples of attitudinal deviations of the hangers 11 suspended from the hanger line 1.

Each hanger 11 is suspended from the hanger line 1 with the upper hook 37 of the hanger 11 being hooked on the pin 53a of the suspender 53 as illustrated in FIG. 9. Due to this, the hanger 11 sometimes swings or is displaced backward and frontward in a conveying direction of the hanger 11 as illustrated in FIG. 10 with arrows. Such displacement spontaneously and uncertainly occurs.

If the displacement of the hanger 11 occurs between the attitude detecting location 21 and the hanging location 17, the stabilizer 27 will not correctly be hung on the hanger 11 at the hanging location 17 even if an attitudinal deviation of the hanger 11 (FIG. 7) is detected at the attitude detecting location 21 and is corrected accordingly. In FIG. 10, the central hanger 11 is normal in attitude and is conveyed in an outlined arrow direction. The left and right hangers 11 in FIG. 10 are displaced leftward and rightward in arrow directions, respectively, and are conveyed in the outlined arrow direction.

To maintain the attitude of each hanger 11 from the attitude detecting location 21 up to the hanging location 17 without change, the guide unit 3 is arranged.

Figure 11:
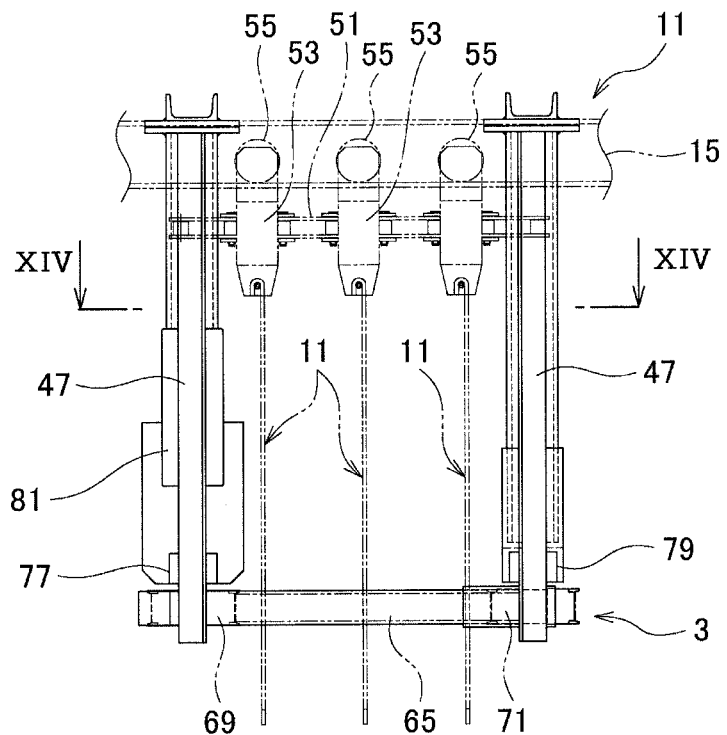
FIGS. 11 and 12 are front and side views illustrating the guiding unit in the hanger line guiding the hangers.
Figure 12:
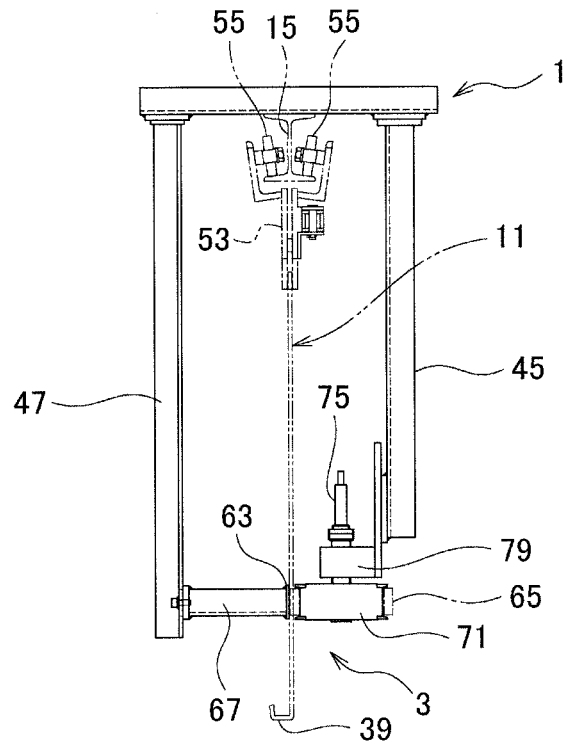
Figure 13:
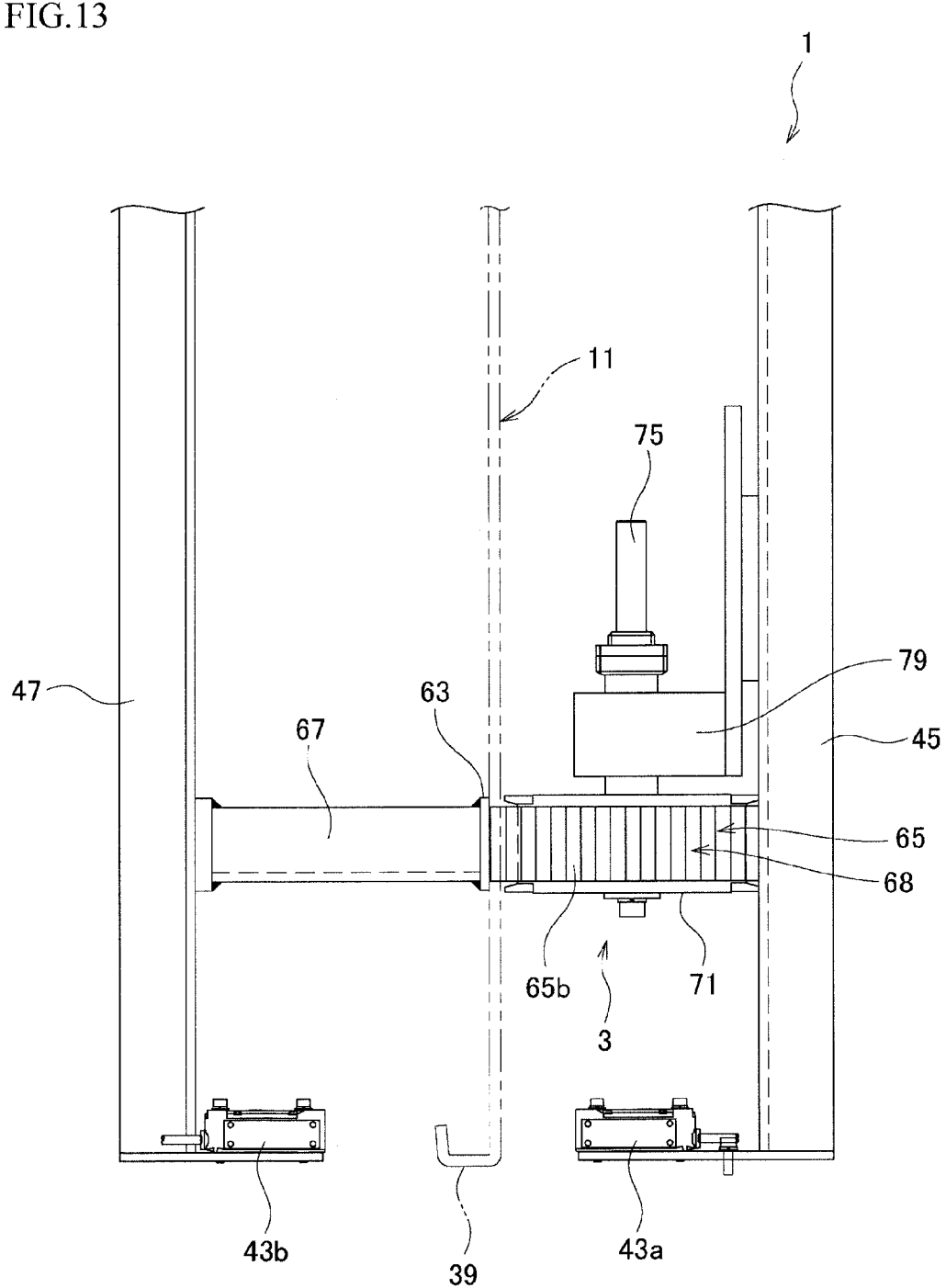
FIG. 13 is an enlarged side view illustrating the guide unit guiding a hanger.
Figure 14:
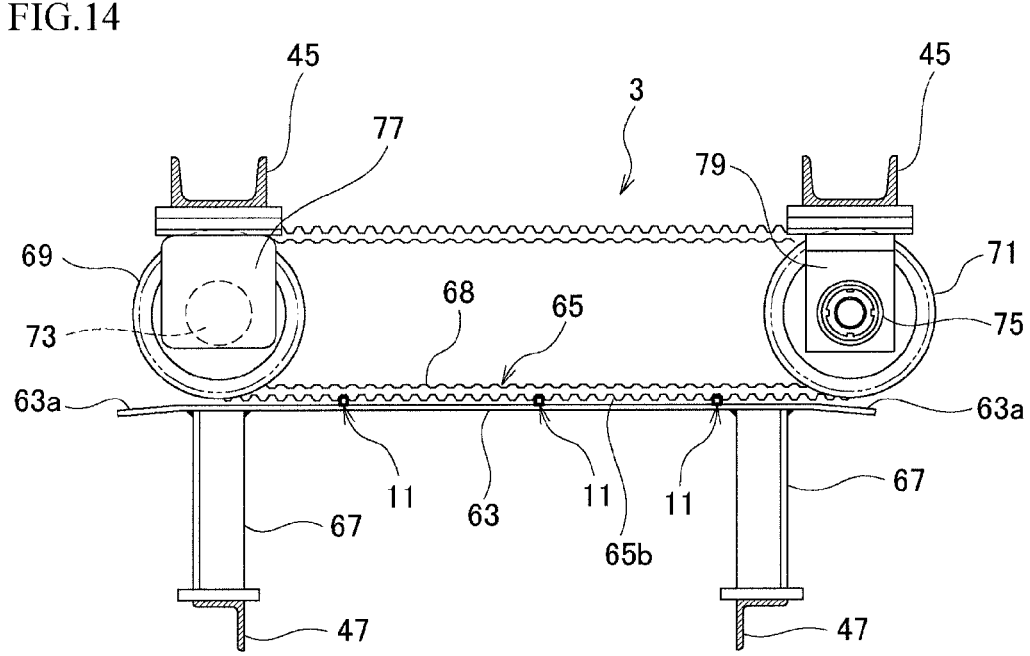
FIG. 14 is a sectional view taken along a line XIV-XIV of FIG. 11.
Figure 15:
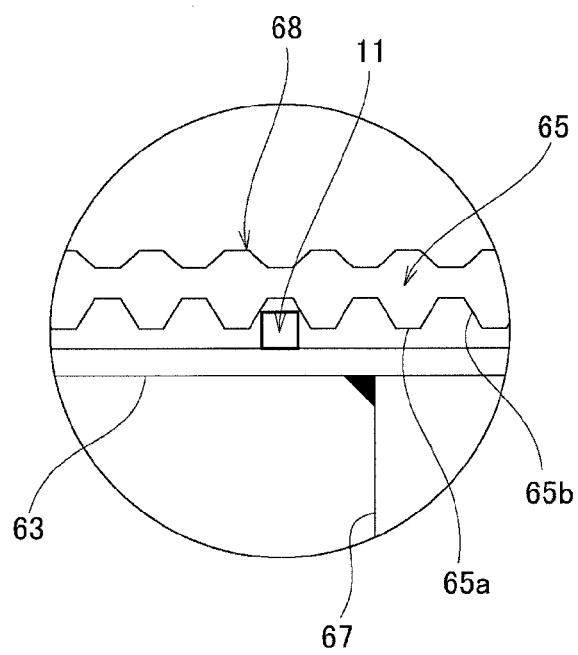
FIG. 15 is an enlarged sectional view illustrating part of FIG. 14.

FIGS. 11 and 12 are front and side views illustrating the guide unit 3 guiding the hangers 11 in the hanger line 1, FIG. 13 is an enlarged side view illustrating the guide unit 3 guiding the hangers 11, FIG. 14 is a sectional view taken along a line XIV-XIV of FIG. 11, and FIG. 15 is an enlarged sectional view illustrating part of FIG. 14.

The guide unit 3 is to maintain the attitude of the hangers 11 without change from the attitude detecting location 21 up to the hanging location 17 and convey them from the location 21 to the location 17. The guide unit 3 is arranged between the hanger frames 45 and 47 and spans between the attitude detecting location 21 and the hanging location 17. According to the embodiment, the attitude detecting location 21 and hanging location 17 are set in the middle of a guiding range of the guide unit 3 in the conveying direction of the hangers 11 corresponding to a guiding direction. The guide unit 3 holds a vertical intermediate part of a target hanger 11 and guides the same in synchronization with the chain 51 of the hanger line 1.

The guide unit 3 includes a guide plate 63 and a guide belt 65 that is driven along the guide plate 63.

The guide plate 63 elongates in the guiding direction of the guide unit 3 and is fixed to the hanger frame 47 with guide brackets 67. At the center between the hanger frames 45 and 47, the guide plate 63 faces the guide belt 65. Each end 63a of the guide plate 63 is slightly inclined. The entrance end 63a of the guide plate 63 functions as a drawing guide to receive the target hanger 11. The surface of the guide plate 63 may be coated with Teflon (registered trademark) to smoothly slide the target hanger 11 along the same.

The guide belt 65 is made of for example, rubber. A face 65a of the guide belt 65 that faces the guide plate 63 has successive recesses 65h. The face 65a of the guide belt 65 that faces the guide plate 63 is slightly spaced away from the guide plate 63 as illustrated in FIG. 15, so that the target hanger 11 is positioned in the recess 65h and is held between the guide plate 63 and the guide belt 65. An inner circumferential face opposite to the face 65a of the guide belt 65 is provided with convexconcave 68 for driving the guide belt 65.

The guide belt 65 is wrapped around a pair of toothed timing pulleys 69 and 71 that are supported with rotary shafts 73 and 75. The rotary shafts 73 and 75 are rotatably supported by bearing blocks 77 and 79 that are fixed to the hanger frame 45.

The rotary shaft 73 of the timing pulley 69 is connected to a guide motor 81 and is driven thereby.

The guide motor 81 is driven according to a driving condition of the motor 13 and is controlled to run the guide belt 65 in synchronization with the chain 51.

A target hanger 11 is carried by the chain 51 toward the attitude detecting location pulled into the gap between the guide plate 63 and the guide belt 65 being driven, and is received in the recess 65b as illustrated in FIG. 15 so that the target hanger 11 is held between the guide plate 63 and the guide belt 65 without change in attitude.

Thereafter, the target hanger 11 is moved between the guide plate 63 and the guide belt 65 with the guide belt 65 driven in synchronization with the chain 51 of the hanger line 1, and at the attitude detecting location 21, the attitude deviation detector 9 detects an attitude of the target hanger 11.

After the attitude detection, the target hanger 11 is still continuously moved between the guide plate 63 and the guide belt 65 with the guide belt 65 synchronized with the chain 51 to the hanging location 17 without changing the attitude thereof.

In this way, the guide unit 3 maintains the attitude of the target hanger 11 from the attitude detecting location 21 up to the hanging location 17, to make the hole 29 of the held stabilizer 27 to correctly catch the hook 39 of the target hanger 11 at the hanging location 17 for hanging the stabilizer 27 on the target hanger 11.

After the hanging operation, the target hanger 11 is moved out of the guide unit 3 and is conveyed to the preparatory process 2 and the like.

The guide unit 3 is not limited to a combination of the guide plate 63 and guide belt 65. The guide unit 3 may have an optional configuration as long as it is able to hold the hanger 11 and convey the same in synchronization with the chain 51 of the hanger line 1. For example, the guide unit 3 may be a combination of a pair of guide belts that are faced to each other and each are supported with a guide plate from behind. In this case, each guide belt may be provided with the recesses 65b, or one of the guide belts may be a flat belt.

Effects of the embodiment will be explained.

According to the embodiment, the guiding apparatus includes the hanger line 1 continuously conveying the hangers 11 that are suspended from the hanger line 1 at predetermined intervals, and the guide unit 3 installed in the hanger line 1 and driven in synchronization with the hanger line 1 while holding at least one of the hangers 11 (target hanger 11), thereby maintaining the attitude of the hanger 11 and guiding the attitude maintained hanger 11 along the hanger line 1.

The embodiment is capable of stabilizing or steadying the attitude of the hanger 11 when hooking the stabilizer 27 on the hook 39 of the hanger 11. Accordingly, the stabilizer 27 is correctly and smoothly hooked on the hook 39 of the hanger 11 after the robot 5 carrying the stabilizer 27 is controlled according to a detected positional deviation of the hole 29 of the stabilizer 27 and a detected attitudinal deviation of the hanger 11.

According to the embodiment, the guide unit 3 has the guide plate 63 and the guide belt 65 that is moved along the guide plate 63 in synchronization with the hanger line 1. The guide belt 65 and guide plate 63 hold the hanger 11 between them to maintain the attitude of the hanger 11 and convey the hanger 11 in synchronization with the chain 51 without breaking the attitude of the hanger 11.

The guide belt 65 has the recesses 65b that are successively formed in the face of the guide belt 65 that faces the guide plate 63, to receive the hanger 11 in one of the recesses 65b and hold the same between the guide plate 63 and the guide belt 65.

Accordingly, the guide unit 3 surely holds the hanger 11 and guides the same while maintaining the attitude of the same.

The embodiment is applicable not only to the hangers 11 but also to any object that is suspended from a hanger line and is subjected to some process. The embodiment is capable of stabilizing and maintaining the attitude of such an object during the execution of the process on the object. For example, the embodiment is applicable to stabilize and maintain the attitude of not only a jig such as a hanger that is used to suspend a product but also a product itself that is directly suspended from a hanger line and is conveyed through the hanger line.

The object to be stabilized by the embodiment is not limited to a rod-like object such as the hanger 11. The object to be stabilized by the embodiment may have an optional shape if the guide unit 3 employs a pair of belts that hold the object therebetween and are driven in synchronization with the chain 51.

Although the guide unit 3 according to the embodiment guides a target hanger 11, the guide unit 3 may simultaneously guide plural hangers 11 including the target hanger 11.

What is claimed is:

1. A guiding apparatus comprising:
 a line continuously conveying objects that are suspended from the line at predetermined intervals; and
 a guide unit installed in the line and driven in synchronization with the line while holding at least one of the objects, thereby maintaining the attitude of the at least one object and guiding the at least one attitude maintained object along the line,
 the guide unit including a fixed guide plate separated from the objects and a guide belt that is moved along the guide plate and in synchronization with the line, and
 the guide unit holding said at least one of the objects between the guide plate and the guide belt so that both the guide plate and the guide belt contact said at least one of the objects and so that said at least one of the objects moves with the guide belt and simultaneously slides on the guide plate so as to be guided along the line.

2. The guiding apparatus of claim 1, wherein the line is a hanger line continuously conveying hangers as the objects, each of the hangers having a hook.

3. A guiding apparatus comprising:
 a line continuously conveying objects that are suspended from the line at predetermined intervals, each of the objects being a rod-like object; and a guide unit installed in the line and driven in synchronization with the line while holding at least one of the objects, thereby maintaining the attitude of the at least one object and guiding the at least one attitude maintained object along the line, the guide unit including a guide plate and a guide belt that is moved along the guide plate in synchronization with the line, the guide belt holding the at least one object with respect to the guide plate and guiding the same along the line, and the guide belt having recesses successively formed in a face of the guide belt that faces the guide plate, the at least one object being received in one of the recesses and held thereat between the guide belt and the guide plate.

4. A guiding apparatus comprising:

a line continuously conveying objects that are suspended from the line at predetermined intervals; and a guide unit installed in the line and driven in synchronization with the line while holding at least one of the objects, thereby maintaining the attitude of the at least one object and guiding the at least one attitude maintained object along the line, the guide unit including a guide plate and a guide belt that is moved along the guide plate in synchronization with the line, the guide belt holding said at least one object with respect to the guide plate and guiding the same along the line, and the guide belt having recesses successively formed in a face of the guide belt that faces the guide plate, said at least one object being received in one of the recesses and held thereat between the guide belt and the guide plate.

* * * * *